US009755957B2

(12) United States Patent
Pacella

(10) Patent No.: US 9,755,957 B2
(45) Date of Patent: Sep. 5, 2017

(54) PSEUDOWIRE CONTROL CHANNEL FOR SIGNALING EVENTS

(71) Applicant: Verizon Patent and Licensing Inc., Arlington, VA (US)

(72) Inventor: Dante J. Pacella, Charles Town, WV (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 245 days.

(21) Appl. No.: 14/457,894

(22) Filed: Aug. 12, 2014

(65) Prior Publication Data
US 2015/0372901 A1 Dec. 24, 2015

Related U.S. Application Data

(60) Provisional application No. 62/014,943, filed on Jun. 20, 2014.

(51) Int. Cl.
*H04L 12/715* (2013.01)
*H04L 12/721* (2013.01)
(Continued)

(52) U.S. Cl.
CPC .......... *H04L 45/28* (2013.01); *H04L 12/4641* (2013.01); *H04L 41/0668* (2013.01);
(Continued)

(58) Field of Classification Search
CPC ............. H04L 12/2859; H04L 12/4641; H04L 41/5003; H04L 45/22; H04L 45/28;
(Continued)

(56) References Cited

U.S. PATENT DOCUMENTS 9,019,814 B1 * 4/2015 Mohanty ................. H04L 45/00
370/219
2007/0180105 A1 * 8/2007 Filsfils ................ H04L 12/2602
709/224
(Continued)

OTHER PUBLICATIONS

IETF; RFC 2453; Nov. 1998; https://tools.ietf.org/html/rfc2453.*
D. Katz; Bidirectional Forwarding Detection (BFD); May 18, 2014; https://tools.ietf.org/html/rfc5880.*

*Primary Examiner* — Noel Beharry
*Assistant Examiner* — Richard Schnell

(57) ABSTRACT

A client edge device relying upon end-to-end pseudowire connections may compensate for network interruptions due to impending events. The device may monitor control channels associated with physical interfaces, where each physical interface is associated with a separate control channel and pseudowires that are associated with virtual local area networks (VLANs). The device may detect an interruption in service over a first control channel associated with a first physical interface, and determine whether an impending event will occur at a first provider edge device associated with the first physical interface. Routing metrics may be adjusted for each VLAN associated with the first physical interface, in order to route ingress traffic away from the first provider edge device and towards another device associated with a different physical interface. The device may reroute traffic to at least one remote customer edge device over a pseudowire associated with the second provider edge device.

20 Claims, 8 Drawing Sheets

(51) Int. Cl.

| | |
|---|---|
| *H04L 12/703* | (2013.01) |
| *H04L 12/46* | (2006.01) |
| *H04L 12/939* | (2013.01) |
| *H04L 12/707* | (2013.01) |
| *H04L 12/801* | (2013.01) |
| *H04L 12/24* | (2006.01) |
| *H04L 12/26* | (2006.01) |

(52) U.S. Cl.
CPC ...... *H04L 41/5019* (2013.01); *H04L 43/0805* (2013.01); *H04L 45/04* (2013.01); *H04L 45/12* (2013.01); *H04L 45/22* (2013.01); *H04L 45/68* (2013.01); *H04L 47/18* (2013.01); *H04L 49/557* (2013.01); *H04L 45/70* (2013.01)

(58) Field of Classification Search
CPC ......... H04L 45/68; H04L 45/70; H04L 47/18; H04L 49/557
See application file for complete search history.

(56) References Cited

U.S. PATENT DOCUMENTS

| | | | | |
|---|---|---|---|---|
| 2011/0242968 | A1* | 10/2011 | Cirkovic | H04L 45/00 370/221 |
| 2012/0163189 | A1* | 6/2012 | Allan | H04L 45/50 370/241.1 |
| 2013/0077495 | A1* | 3/2013 | Friskney | H04L 12/4645 370/237 |
| 2016/0261501 | A1* | 9/2016 | Hegde | H04L 45/22 |

\* cited by examiner

800

PSEUDOWIRE CONTROL CHANNEL FOR SIGNALING EVENTS

RELATED APPLICATION

This application claims priority under 35 U.S.C. §119 to U.S. Provisional Patent Application No. 62/014,943, entitled "PSEUDOWIRE CONTROL CHANNEL," and filed on Jun. 20, 2014, the disclosure of which is hereby expressly incorporated herein by reference in its entirety.

BACKGROUND

For networks which employ connections relying upon end-to-end pseudowire connections, network outages due to network devices and/or paths failing can be compensated for by using existing mechanisms when the packet losses are within service level agreements (SLAs). However, such mechanisms are limited when reacting to a failure and are not sufficient for scheduled downtime. Accordingly, conventional mechanisms may not be desirable when the loss is outside the SLAs or is simply not tolerable, and/or the loss causes process changes which are undesirable for clients accessing a provider network.

DETAILED DESCRIPTION OF PREFERRED EMBODIMENTS

Figure 1:
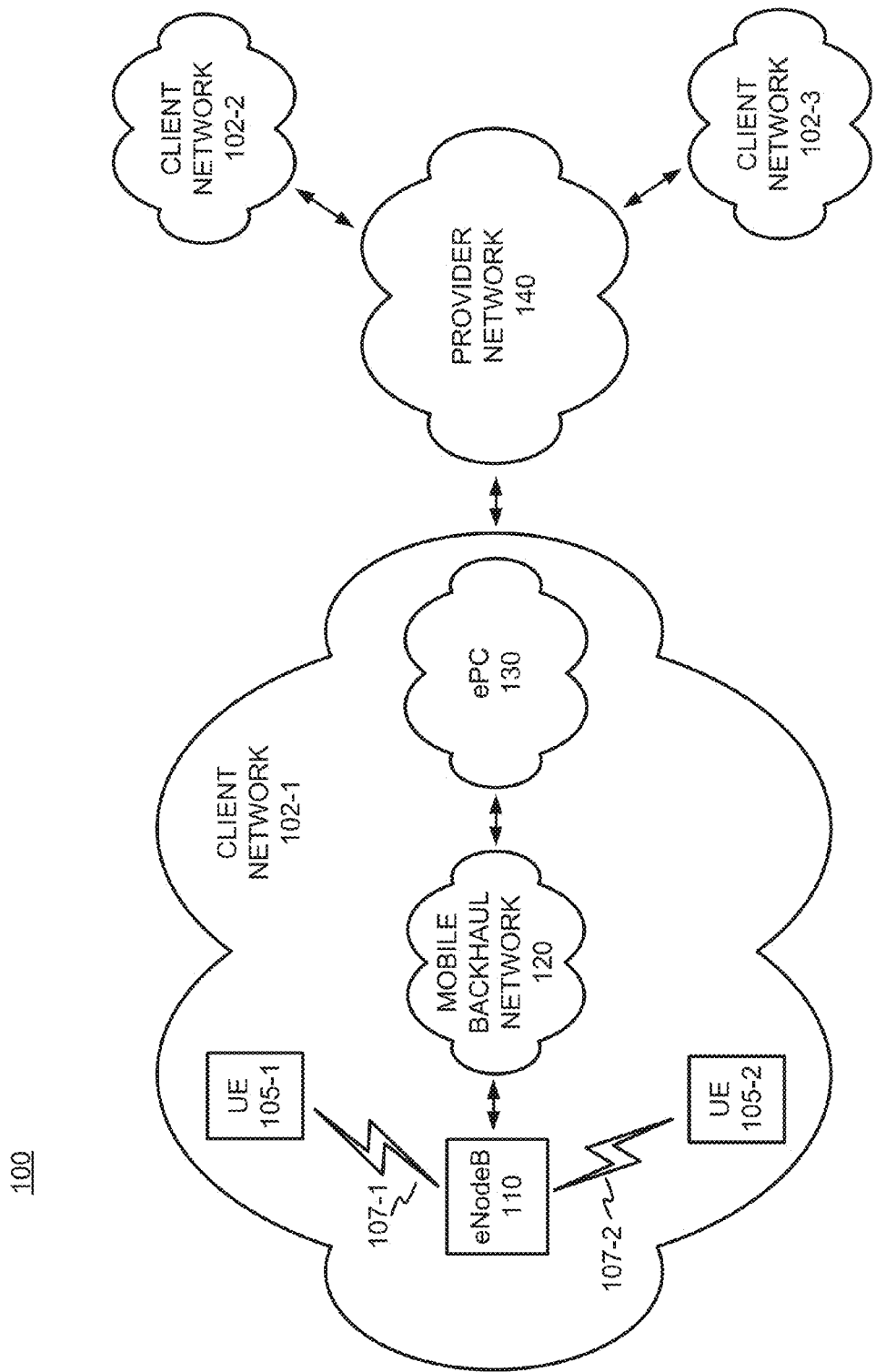
FIG. 1 is a diagram showing an exemplary environment where a provider network exchanges traffic with multiple client networks.

The following detailed description refers to the accompanying drawings. The same reference numbers in different drawings may identify the same or similar elements.

Embodiments are described herein for establishing and employing a pseudowire (PW) control channel to compensate for network interruptions due to maintenance events which may occur within a supporting network, such as, for example, a provider network. Embodiments described herein can overcome the limitations of conventional mechanisms by reacting appropriately to network outages caused, for example, by scheduled maintenance.

As used herein, PWs may be defined as an emulation of a point-to-point connection over a packet-switching network (PSN). Thus, as seen by client edge devices, the PW may appear as an unshared link between two network devices for supporting telecommunication and/or networking services which may be provided across an underlying network. The PW may emulate any arbitrary services between the network devices across the underlying network, where such services may include Ethernet, T-n leased line, frame relay, Asynchronous Transfer Mode (ATM), Synchronous Optical Networking/Synchronous Digital Hierarchy (SONET/SDH). The underlying network may be a packet switched network which uses Ethernet, Internet Protocol (IP), Multiprotocol Label Switching (MPLS), other known protocols, or any combination thereof. Accordingly, PWs may manage encapsulation, timing, order, and other operations so traffic exchange over the underlying network is transparent to network devices connected by the PW. The PW serves as a tunnel providing an unshared link or circuit for the emulated service provided to the network devices interconnected by the PW. For example, given an underlying IP network, a PW may be defined within Layer 3 (network layer) and be considered a physical emulation of a direct physical interface between two network devices, and can further simplify handoffs between two different Layer 3 networks.

Given the logical separation between the PWs and the underlying networks, there is no conventional mechanism (e.g., predefined control channels) to notify network nodes interconnected by a PW of impending maintenance of the underlying network. Such maintenance can negatively impact network services between the interconnected nodes unless traffic is redirected over unaffected segments of the underlying network. Embodiments herein establish and utilize a control channel which may be associated with a group of PWs which are supported by a given physical interface to the underlying network. For example, a network node (e.g., a client edge device) accessing the underlying network (e.g., a provider network) may monitor the control channel to determine whether a maintenance event of an infrastructure device (e.g., a provider edge device) in the underlying network is imminent. If so, the network node may redirect traffic exchanged over the given physical interface to other sections of the underlying network which are not affected by the maintenance event. Once the maintenance is completed, the control channel may be used signal the network node to restore the service associated with the PW supported by the physical interface to the infrastructure device.

FIG. 1 is a diagram showing an exemplary networking environment 100 where a provider network exchanges traffic with multiple client networks. In an embodiment, the networking environment 100 may include client networks 102 (as used herein, plurally referred to as "client networks 102" and individually as "client network 102-x") and provider network 140. Client networks 102 may be any type of network carrying traffic for telecommunications and/or networking services for residential, commercial and/or enterprise applications. Provider network 140 may be any type of provider network (e.g., a backbone network, a core network, etc.) which provides networking services between client networks 102 and other various networking entities, such as, for example, other core/backbone networks (not shown). Provider network 140 may be interconnected to client networks 102 over any suitable physical interfaces. As will be described in reference to FIG. 2, client networks 102 may utilize multiple physical interfaces to provider network 140 for redundancy. The redundancy may prevent network outages due to potential component issues (e.g., line card failures, circuit outages, etc.) and maintenance events in provider network 140. For ease of explanation, only a limited number of network elements are shown in network environment 100 depicted in FIG. 1. However, it should be understood that a greater number of network elements may be part of network environment 100, including other types of known network entities not illustrated in FIG. 1. Other embodiments may include additional or different network entities in alternative configurations than which are exemplified in FIG. 1.

Provider network 140 may be any type of core or backbone network connecting various client networks to other client networks, backhaul networks and/or other core networks. Provider network may also be known as a provider network, and may include wide area network (WAN), a metropolitan area network (MAN), an intranet, the Internet, a cable-based network (e.g., an optical cable network), networks operating known protocols, including Ethernet, Multiprotocol Label Switching (MPLS), Transmission Control Protocol/Internet Protocol (TCP/IP), Asynchronous Transfer Mode (ATM), Optical Transport Network (OTN), Synchronous Optical Networking (SONET), Synchronous Digital Hierarchy (SDH), other suitable network protocols, or any combination thereof.

Client networks 102 may provide enterprise services, services for mobile telecommunications, and/or any type of networking support for various business class and/or residential networking services. Such services could include telecommunications, unicast, broadcast and/or multicast multimedia services, etc. In one example, client network 102-1 include networking elements associated with a cellular telecommunications network, which may be based on wireless standards including, for example, Long Term Evolution (LTE). Accordingly, client network 102-1 may include User Equipment (UE) 105 (as used herein, plurally referred to as "UE 105" and individually as "UE 105-$x$"), evolved Node Bs (eNodeB) 110, a mobile backhaul network 120, and an evolved Packet Core (ePC) 130. While some examples for client networks 102 may be described herein within the context of the LTE wireless standard, it should be apparent that embodiments of the invention are not restricted to any wireless or wired networking standard and/or services. Embodiments may provide support for any general provider-client relationship for a dedicated Layer 2 transport service. For example, for Layer 2 services, there typically is at least one "local" and "remote" attachments, and in some embodiments, mesh multipoint to multipoint (mp2mp) and/or point to multipoint (p2mp), where provider network 140 is connecting at least two client network 120 "islands." Embodiments may further include Layer 3 services (e.g., Internet reachability and/or community-based virtual private networks (VPNs) may provide interconnectivity based on a single connection approach.

UEs 105 may communicate with eNodeB 110 over a wireless channel 107 (plurally referred to as "wireless channel 107" and individually as "wireless channel 107-$x$"). EnodeB 110 may exchange traffic data with ePC 130 via mobile backhaul network 120. Mobile backhaul network 120 may further exchange traffic between eNodeBs in an LTE system without having to go through the ePC 130. EPC 130 may further exchange traffic data with provider network 140. While FIG. 1 only shows one eNodeB 110 connected to mobile backhaul network 120, the mobile backhaul network 120 may be functionally coupled to a plurality of eNodeBs. Moreover, a plurality of eNodeBs may be functionally interconnected to each other in addition to being separately connected to mobile backhaul network 120, and may be referred to as the evolved UMTS Terrestrial Radio Access Network (eUTRAN). In other embodiments using different wireless standards, the eNodeBs may be referred to as base stations and the eUTRAN referred to simply as a Radio Access Network (RAN). In addition to exchanging traffic with eNodeB 110 via mobile backhaul network 120, EPC 130 may perform control operations for eNodeB 110 and UEs 105 based at least in part on control plane signals (e.g., Non-Access Stratum functionality). EPC 130 may interface with each other ePCs through provider network 140 to exchange traffic data.

Further referring to FIG. 1, mobile backhaul network 120 may be any type network which supports one or more eNodeBs 110 for interfacing with ePC 130. Mobile backhaul network 120 may include Cell Site Routers (CSRs), Extended Backhaul (EBH) network(s), optical networks which include wavelength division multiplexed (WDM) optical components, multiservice provisioning platforms (MSPPs), metro-Ethernet networks, etc.

EPC 130 may be a core networking infrastructure that provides mobility management, session management, authentication, and packet transport to support UEs 105 and eNodeBs for wireless communication, and further provide wireless networking elements access to provider network 140. EPC 130 may be compatible with known wireless standards which may include, for example, LTE, LTE Advanced, Global System for Mobile Communications (GSM), Universal Mobile Telecommunications System (UMTS), IS-2000, etc.

ENodeB 110 may be any type of base station that can be included within any type of radio access network, and can be compatible with known wireless standards. Such standards may include, for example, LTE, LTE Advanced, GSM, UMTS, IS-2000, etc. In some embodiments, eNodeB 110 may be a wireless access point which can service any type of WiFi standard (e.g., any IEEE 801.11x network, where x=a, b, c, g, and/or n), and/or include any other type of wireless network technology for covering larger areas, and may include a mesh network (e.g., IEEE 801.11s) and/or or a WiMAX IEEE 802.16.

UE 105 may include any type of mobile device having communication capabilities, and thus communicate with eNodeB 110 using a variety of different wireless channels. In some embodiments, the mobile device may communicate within network environment 100 using a wired connection. Thus UE 105 may be a mobile device that may include, for example, a cellular radiotelephone, a smart phone, a tablet, a set-top box (STB), a mobile phone, an type of IP communications device, a Voice over Internet Protocol (VoIP) device, a laptop computer, a palmtop computer, a gaming device, a media player device, or a digital camera that includes communication capabilities (e.g., wireless communication mechanisms). In various embodiments, wireless channels 107 may be supported by any cellular radio access network (RAN), such as, for example, an LTE eUTRAN. In other embodiments, wireless channels 107 may be supported by a local or wide area wireless network. A local area wireless network may include any type of WiFi (e.g., any IEEE 801.11x network, where x=a, b, c, g, and/or n). A wide area wireless network may include any type wireless network covering larger areas, and may include a mesh network (e.g., IEEE 801.11s) and/or or a WiMAX IEEE 802.16.

Figure 2:
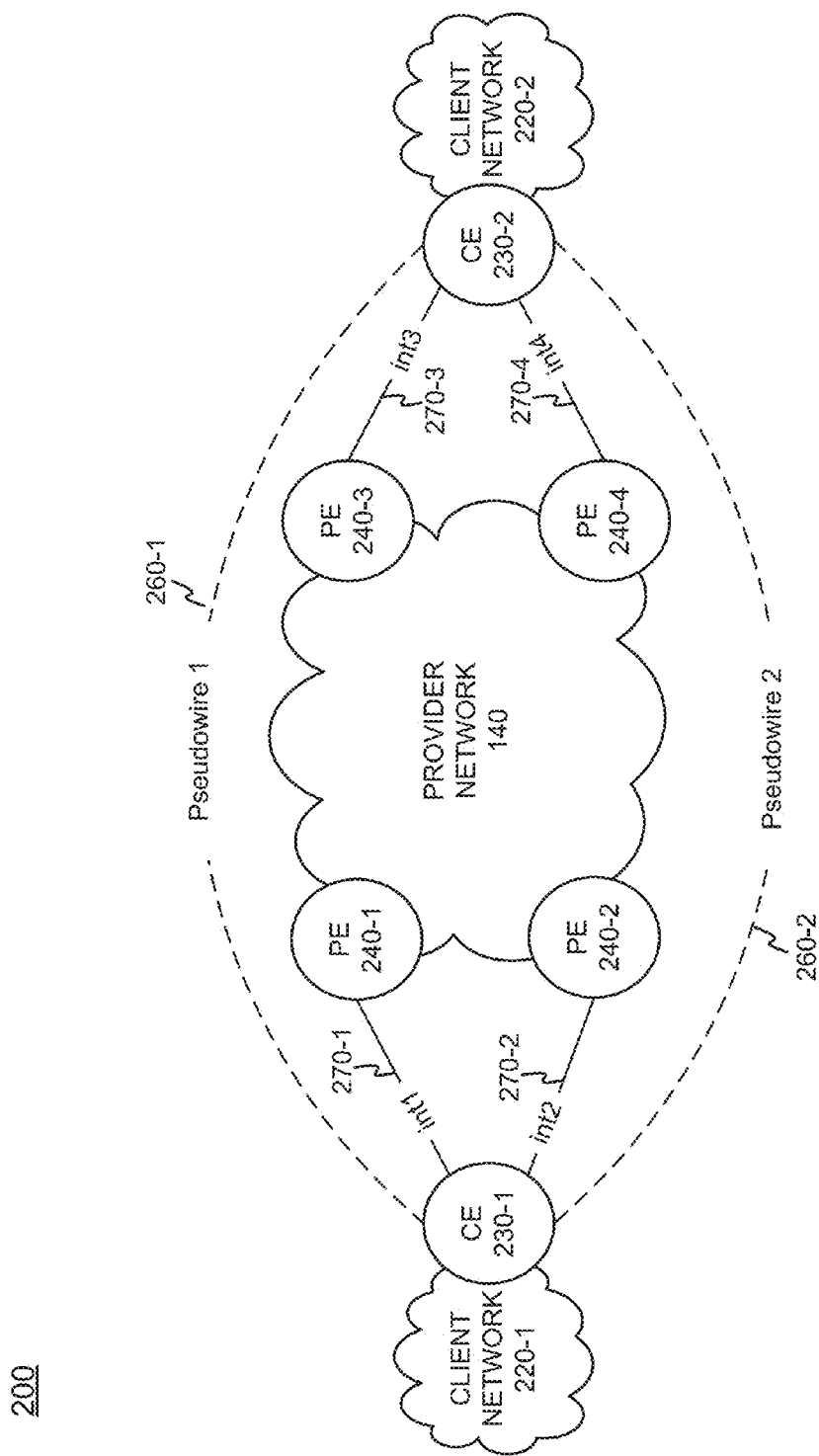
FIG. 2 is a diagram illustrating an overview of an exemplary network utilizing end-to-end pseudowires (PWs) for interconnecting client edge devices through a provider network.

FIG. 2 is a diagram illustrating an overview of an exemplary network 200 utilizing end-to-end pseudowires (PWs) which may interconnect client edge devices through a network. Exemplary network 200 may include a provider network 140, where the provider network may further include a plurality of provider edge devices (PEs) 240 (as used herein, plurally referred to as "provider edge devices 240" and individually as "provider edge device 240-*x*"). Network 200 may further include client networks 220 (as used herein, plurally referred to as "client networks 220" and individually as "client network 220-*x*"), where the client networks 220 may further include one or more client edge devices (CE) 230 (as used herein, plurally referred to as "client edge devices 230" and individually as "client edge devices 230-*x*"). For ease of explanation, only a limited number of CEs 230 and PEs 240 are shown in network environment 200 depicted in FIG. 2. However, it should be understood that a greater number of network elements may be part of network environment 200, including other types of known network entities not illustrated in FIG. 2. Other embodiments may include additional or different network entities in alternative configurations than which are exemplified in FIG. 2. For example, additional CEs 230 and/or PEs 240 (not shown) may be configured in various architectures, such as, for example, in a mesh network.

To establish robust connections to provider network 140, CEs 230 may have multiple physical interfaces 270 (as used herein, plurally referred to as "physical interfaces 270" and individually as "physical interface 270-*x*") to the provider network 140 through different PEs 240. As shown in FIG. 2, each physical interface 270-*x* is abbreviated as "intX," where X=1, . . . , N. Accordingly, CE 230-1 may connect to PE 240-1 over int1 270-1, and also may connect to PE 240-2 over int2 270-2. CE2 230-2 may connect to PE 240-3 over int3 270-3, and also may connect to PE 240-4 over int4 270-4. The multiple physical interfaces 270 may provide redundancy to prevent outages due to component failure and maintenance events.

Communications between CEs 230 may be supported using end-to-end PWs 260 (as used herein, plurally referred to as "PWs 260" and individually as "PW 260-*x*") across provider network 140. For example, as shown in FIG. 2, traffic between CE 230-1 and CE 230-2 going across provider network 140 may be supported using multiple end-to-end PWs 260. A first PW 260-1 between CE 230-1 and CE 230-2 may be supported by int1 270-1 through PE 240-1, over provider network 140 through PE 240-3, and finally over int3 270-3. A second PW 260-2 between CE 230-1 and CE 230-2 may be supported by int2 270-2 through PE 240-2, over the provider network 140 through PE 240-4, and finally over int4 270-4. While only two PWs 260 are shown in FIG. 2, which represent two redundant physical planes of provider network 140, practically any number may be used to provide robust communications between CEs 230 across provider network 140.

In other embodiments, there may be more physical interfaces 270 to each PEs 240 than is shown in FIG. 2. For example, CE 230-1 may connect to other CEs 230 over provider network 140 via multiple pairs of physical interfaces (not shown). In another example, PEs 240 may also host PW connections from one or more additional CEs 230 (not shown) which may belong to a common client network (e.g., 220-1) or a different client network (not shown). In various configurations, there may be many CEs 230 directly connected to one or more PEs 240 to form a complex network. In an alternative embodiment, network devices, in particular client network (not shown), may serve as provider edge devices or provider routers of that particular client network, but appear to the provider network client edge devices, thus as a result the relative function of the network devices may be that of a CE device. In another embodiment, in addition to CE 230-1 having PW connections at least to CE 230-2 on the remote side of provider network 140 as noted above, CE 230-1 may also have connections to other CEs 230 (not shown) which may be "u-turned" off "local" PE 240-1 and/or local PE 240-2. Alternatively, for example, other remote CEs (not shown) may be connected to CE 230-1 across provider network 140 through remote PEs, such as, for example PE 240-3 and/or PE 240-4, to the other remote CEs.

In an embodiment, support for end-to-end PWs 260 between CEs 230 may be provided by creating logical separations through a sequence of VLANs between the CEs 230 and PEs 240, and further establishing other separate VLANs throughout the provider network 140. Accordingly, over physical interfaces 270 between CEs 230 and PEs 240, separate pseudowire connections, which traverse through provider network 140, may be established for communications between CEs 230 by mapping the PWs 260 over separate VLANs. Accordingly, each CE 230-*x* may have at least one separate PW 260-*y* to communicate with another CE 230-*z* over provider network 140. Accordingly, (as will be described below in reference to FIG. 3), separate VLANs between CEs 230 and PEs 240 may support separate pseudowires for connecting different pairs of CEs 230 over PEs 240. Thus, a given physical interface 270, may support a plurality of different VLANs, where each VLAN supports a separate PW 260-*x*. Accordingly, a given CE 230-*x* may exchange traffic with any other CE 230-*y* over separate PWs 260. Moreover, to provide additional redundancy, multiple PWs 260 may be established between pairs of CEs 230, where different CEs are supported by separate physical interfaces 270 between CEs 230 and PEs 240, and by using different topologies through the provider network 140. For example, as shown in FIG. 2, two separate PWs 260 are shown which connect CE 230-1 and CE 230-2 across provider network 140. PW 1 260-1 is supported by physical interface int1 270 between CE 230-1 and PE 240-1, and by physical interface int3 270-3 between PE 240-3 and CE 230-2. Separate PW 2 260-2 is supported by physical interface int2 270-2 between CE 230-1 and PE 240-2, and by physical interface int4 270-4 between PE 240-4 and CE 230-2. To provide greater redundancy, additional PWs may be established between CE 230-1 and CE 230-2 by adding additional physical interfaces 270 between CEs 230 and PEs 240.

By using different VLANs to support each PW 260 connection, a logical separation may be established between the PWs 260 and their underlying networks. While such separation is useful in a number of different aspects, such as, for example, network configuration, maintenance and security, it also may prevent conventional signaling mechanisms to notify CEs 230 of impending maintenance events. Such maintenance events may occur at PEs 240, or in other devices within provider network 140. Accordingly, embodiments herein may create a dedicated control channel associated with each physical interface 270 that may provide notifications of impending maintenance occurring on provider network 140. The notifications may occur by providing a signal over a control channel, and in one embodiment, the signal may take the form of shutting down or suspending a service which is being monitored by CEs 230. For example, once the service on the control channel associated with a particular physical interface 270-*x* goes down, CE 230-*x*, which is monitoring the control channel, may interpret this as a signal that a maintenance event is about to occur, for example, at PE 240-*x* associated with physical interface 270-*x*. Accordingly, the CE 230-*x* may take steps to redirect traffic away from PE 240-*x* prior to the maintenance event occurring in order to avoid lost packets. In other embodiments, the signal over the control channel be provided in the form of other messages, as will be described in more detail below.

In an embodiment, the control channel may be created using a specified VLAN on the physical interfaces 270 to the provider network 140. The control channels associated with the physical interfaces 270 connected with each CE 230-$x$ may be monitored by CE 230-$x$ itself, or optionally by an independent network monitoring system described below in relation to FIG. 3. In an embodiment, the monitoring may be carried out by setting up a Layer 3 VLAN for a control channel associated with each physical interface 270. A Bidirectional Forwarding Detection (BFD) session may be supported by the control channels which is monitored by CEs 230. BFD may be a "lightweight" (i.e., low overhead) protocol which can detect faults on physical media by establishing a session between two endpoints over a particular link. CE 230-1 to CE 230-2 may rely on BFD to detect link failure along the end-to-end path, where the client network may not directly manage the end-to-end path. If one or more network devices and/or links fail, and no redundant path is established within, for example, 1.5 seconds (e.g., 3 consecutive missed BFD hellos), a PW 260-$x$ may be declared as being inoperative. In order to avoid traffic loss, a CE 230-$x$ may monitor a particular control channel and detect that a BFD session for the monitored control channel goes down. The CE 230-$x$ may react by redirecting packets across another physical interface prior to the other VLANs on the physical interface going down.

In other embodiments, the control channel may use other message types to provide the signal for notifying the CE 230$s$ of impending maintenance. For example, some messages may take the form of changes to the Layer 2 service in IP nodes or links, changes in metric or cumulative latency, and/or a reliability score based on circuit flaps. Such messages could be defined upon creating a new messaging service, or act as an extension or as an analog to the existing BFD service. Upon receiving such a message type, depending upon a client-configured rule set, the client may make metric adjustments to reroute traffic. Details of rerouting traffic by adjusting networking metrics are described below with respect to FIG. 3.

In existing networks, maintenance events occurring on a particular PE 240-$x$(e.g., PE 240-1) may cause many (e.g., dozens in a typical network) of CEs 230 to lose packets before BFD failure detection declares the interface down. If this loss is within the service level agreement (SLA), similar to transport maintenance events, existing mechanisms may compensate and/or care for the traffic losses. However, such an "intentional" loss event may require customer notification. If the packet loss is not tolerable to the customer/client device and/or change to the process is not desired, embodiments described herein may utilize the above described control channel wherein PE 240-$x$(e.g., PE 240-1) may signal one or more "local" CEs 230 (i.e., CEs 230 which are directly connected to PE 240-$x$ via physical interfaces 270, such as, for example, CE 230-1) that a maintenance event is imminent by shutting down the BFD session on the control channel associated with the interconnecting physical channel (e.g., int1 270-1). For example, CE 230-1 which is local to PE 240-1 may detect the closure of the BFD session as a signal for impending maintenance, and adjust the VLANs going to PE 240-1 to avoid packet losses by redirecting traffic to other paths, as long as other paths are available. When this occurs, the "remote" CE devices (e.g., CE 230-2) may detect asymmetric metrics (e.g., based upon pre-defined values) and may perform adjustments on the remote side. The overall effect may emulate an overload so conventional routing algorithms in the appropriate CEs 230 reroute the affected traffic. For example, traffic exchanged between CE 230-1 and CE 230-2 would no longer use PW1 260-1 which relies PE 240-1 and PE 240-3. Instead, CE 230-1 and CE 230-2 may exchange traffic bidirectionally over PW 2 260-2, which relies upon PE 240-2 and PE 240-4 for support.

In an embodiment, an operator of a particular PE 240-$x$ may measure ingress/egress traffic going to the set of subtending CEs 230 (this monitoring can also be automated to detect PW interface descriptions and verify traffic removal). If there is still active traffic, then client network 220-$x$ can be contacted, the where the maintenance may be cancelled or the maintenance may proceed, depending on the rules for the network.

CEs 230 may include any type of network device(s) capable of providing connectivity to devices within and/or outside of provider network 140, and thus, for example, may exchange traffic with other PEs 240 as shown in FIG. 2, and exchange traffic with other CEs in different client networks 220 through provider network 140, also as shown in FIG. 2. Alternatively, CEs may exchange traffic with other CEs (not shown) within the same client network 220 without having to go through provider network 140. CEs 230 may include devices operating at network Layer 2 and/or Layer 3, and thus may include routers, switches, etc. For example, one or more CEs 230 may route traffic based on IP address and/or MPLS labels.

PEs 240 may include any type of network device(s) capable of providing connectivity to devices within and/or outside of provider network 140, and thus, for example, may exchange traffic with other PEs 240 within provider network 140 and with CEs 230 belonging to client networks 220. PEs 240 may include devices operating at network Layer 2 and/or Layer 3, and thus may include routers, switches, etc. For example, one or more PEs 240 may route traffic based on IP address and/or MPLS labels. In another example, one or more PEs 240 may be hybrid devices such as, for example, Ethernet switches facing client networks 230 and MPLS routers facing "inward" towards provider network 140.

Client networks 220 may include a network associated with a customer site for providing telecommunication and/or networking services, as described in more detail above with reference to FIG. 1 and client network 102.

Provider network 140 may include one or more networks of any type, such as, for example, a local area network (LAN), a wide area network (WAN), a wireless satellite network, and/or one or more wireless public land mobile networks (PLMNs). Provider network 140 may further include any type of wide area network that connects backhaul networks and/or core networks, and may include a metropolitan area network (MAN), an intranet, the Internet, a cable-based network (e.g., an optical cable network), networks operating known protocols, including Asynchronous Transfer Mode (ATM), Optical Transport Network (OTN), Synchronous Optical Networking (SONET), Synchronous Digital Hierarchy (SDH), Multiprotocol Label Switching (MPLS), and/or Transmission Control Protocol/Internet Protocol (TCP/IP).

Physical interfaces (intN) 270 include any suitable interface for providing connectivity between CEs 230 and PEs 240. Physical interfaces 270 may include optical interfaces (e.g., single mode and/or multimode fiber for OTN, OC-n, SONET/SDN, etc.), electrical interfaces (e.g., cable assemblies for Ethernet), and/or wireless (e.g., microwave links).

As used herein, the term "router" may refer to a network Level 2 or Level 3 (e.g., an Internet Protocol (IP) level) router or switch (e.g., Multiprotocol Label Switching (MPLS) router). The term "packet," as used herein, may refer to an IP packet, datagram, cell, a fragment of an Internet Protocol (IP) packet, or other types of data that may be carried at a specified communication layer.

Figure 3:
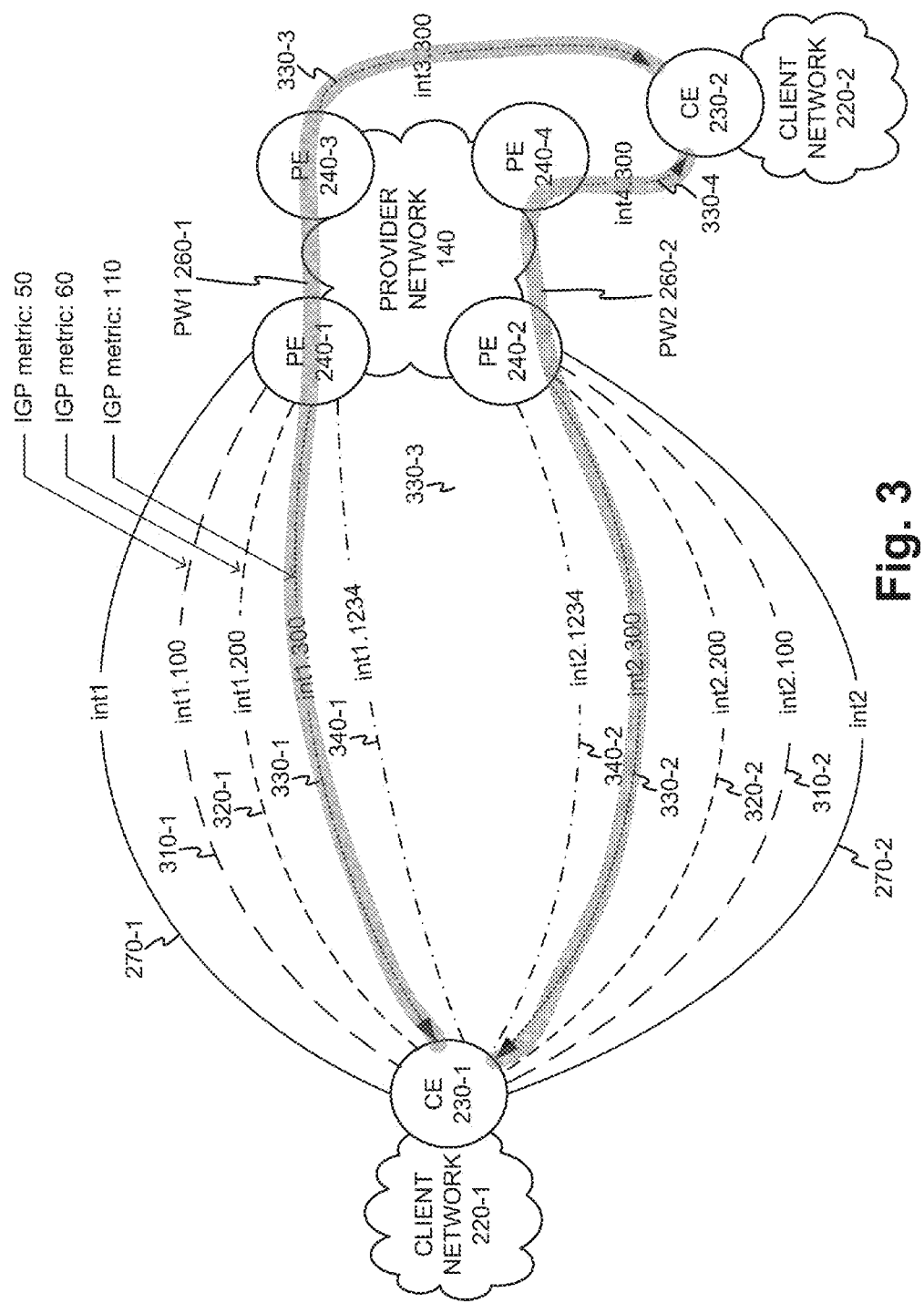
FIG. 3 is a diagram illustrating an embodiment of a virtual local area network (VLAN) to PW mapping over a physical interface associated a customer edge device (CE)

FIG. 3 is a diagram illustrating an embodiment of a virtual local area network (VLAN) to PW mapping over a physical interface associated a client edge device. A CE device may have multiple redundant physical interfaces with a provider network, where each physical interface may be segmented into multiple logical channels and a reserved control channel. The reserved control channel may permit the monitoring of impending maintenance or other events of provider edge devices.

For example, as shown in FIG. 3, CE 230-1 may include multiple redundant physical interfaces 270 (int1 & int2) to provider network 140, where int1 270-1 interfaces with PE 240-1 and int2 270-2 interfaces with PE 240-2. Logical channels may be established over each physical interface 270 using, for example, Layer 3 VLANs. For example, as shown in FIG. 3, physical interface int1 270-1 may include three VLANs. Each VLAN may have a channel identifier which indicates the physical channel for which it is associated, and a VLAN ID that is consistent throughout provider network 140 and client networks 220. For example, the channel identifier may have the format "int<i>.<wxyz>," where <i> may indicate a physical channel, and <wxyz> indicates a VLAN ID. For example, with respect to int1 270-1, VLAN 310-1 may be designated with the VLAN ID "100," VLAN 320-1 may be designated with the VLAN ID "200," and VLAN 330-1 may be designated with the VLAN ID "300." The control channel may be mapped from VLAN 340-1 and be designated with the VLAN ID "1234." Because the control channel may be specifically designated for monitoring maintenance events affecting traffic over pseudowires, the control channel may have a common VLAN ID reserved for all the pseudowires on each physical channel 270-x. The actual value for the VLAN ID of the control channel is arbitrary, as long as the control channel's VLAN ID is consistently and predictably reserved, which is associated with every pseudowire interface. Further referring to FIG. 3 and with respect to physical interface int2 270-2, which interconnects CE 230-1 with PE 240-2, VLAN 310-2 may be designated with the VLAN ID "100," VLAN 320-2 may be designated with the VLAN ID "200," and VLAN 330-2 may be designated with the VLAN ID "300." The control channel may be mapped from VLAN 340-2 and be designated with the VLAN ID "1234."

Because the VLAN IDs may be consistent throughout the network, each VLAN ID can support a separate pseudowire which interconnects a pair of CEs through provider network 140. For example, as shown in FIG. 3, PW1 260-1 (shown as a shaded overlay) interconnects CE 230-1 and CE 230-2 through PE 240-1 and PE 240-3. Specifically, PW 260-1 is supported by VLAN 330-1 on physical interface int1 270-1, and by VLAN 330-3 on physical interface int3 (which interconnects PE240-3 and CE 230-2, but is not shown). Another pseudowire, PW2 260-2, may provide a redundant connection between CE230-1 and CE 230-2. PW2 260-2 is supported by VLAN 330-2 over physical interface int2 270-2, which connects with PE 240-2. PW2 260-2 may be supported by PE 240-4 for interconnection across provider network 140, and terminate at CE 230-2 using VLAN 330-4 (VLAN ID 300) over physical interface int4 (not shown). Note that because both PW1 260-1 and PW2 260-2 support pseudowires between CE 230-1 and CE 230-2, these pseudowires are mapped over VLANs having the common VLAN ID "300."

Each VLAN may have a local steady state metric for client network 220-1, which may be expressed using, for example, a metric associated with an Internet Gateway Protocol (IGP). The IGP metric may include numerical values which reflect the "distance" of a particular route based the topology of a network, which may reflect at least one of the actual distance, number of hops, time delays, cost, etc. associated with the particular route, and/or the bandwidth of connections over a particular route. Default or steady state IGP values may be predefined on a network device (e.g., a router). For example, as shown in FIG. 3, VLANs 310-1, 320-1, and 330-1 may be associated with steady state IGP metrics of 50, 60, and 110, respectively. In general, IGPs may be divided into two categories: distance-vector routing protocols and link-state routing protocols. Specific examples of IGP protocols may include Open Shortest Path First (OSPF), Routing Information Protocol (RIP) and Intermediate System to Intermediate System (IS-IS).

The control channels (e.g. 340-1 having VLAN ID "1234") may run a dedicated link management protocol, such as Bidirectional Forwarding Detection (BFD), which is reserved for monitoring maintenance events occurring within provider network 140. The BFD session may not be required for any Layer 2 VLAN state maintenance, but for determining when maintenance events are about to occur, for example, on a given provider edge device.

Figure 4:
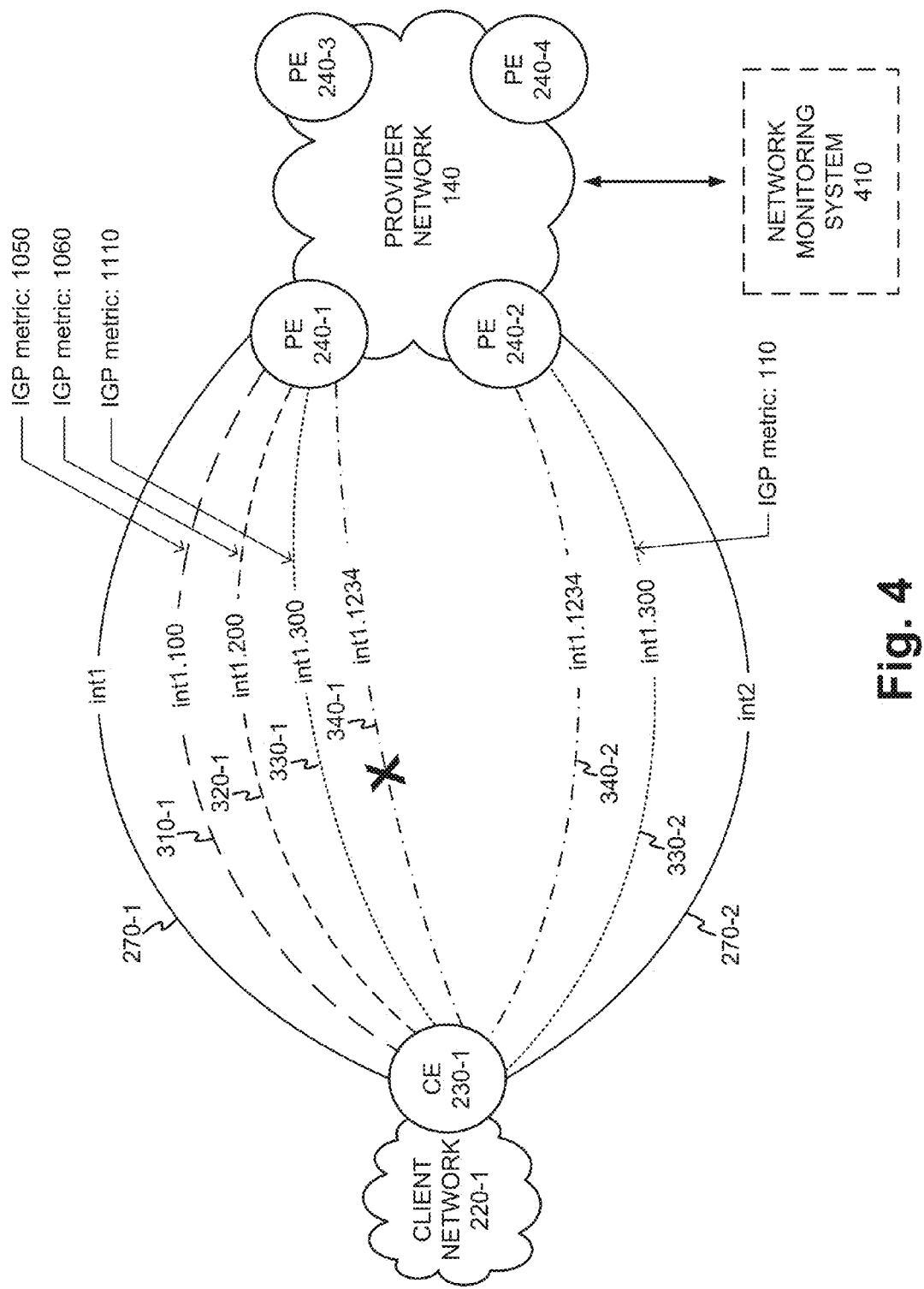
FIG. 4 is a diagram illustrating exemplary maintenance detection by a local client edge device and an interior gateway protocol (IGP) adjustment compensating for the maintenance.

FIG. 4 is a diagram illustrating exemplary maintenance detection by a local client edge device and a subsequent interior gateway protocol (IGP) adjustment compensating for the maintenance. As used herein, a "local" client edge device is proximate (e.g., shares a direct physical interface) to the provider edge device which is about to undergo maintenance. A "remote" client edge device may share a pseudowire connection with the local client edge device, but is distal to provider edge device about to undergo maintenance. That is, the remote client edge device may not share a direct physical interface with the provider edge device undergoing maintenance, but may connect via the provider network. In the example, shown in FIG. 4, PE 240-1 is about to undergo maintenance. Accordingly, CE 230-1 is a local client edge device, and CE 230-2 (not shown in FIG. 4, but shown FIGS. 3 and 5) is the remote client edge device.

Accordingly, when PE 240-1 is about to be impacted by a maintenance event, the operator of PE 240-1 may run a command or script that disables BFD sessions on all reserved VLANs associated with PE 240-1. Any client edge devices sharing physical interfaces with affected PE 240-1 will be monitoring the state of the BFD session on the control channels associated with their respective physical interfaces. For example, CE 230-1, which is connected to PE 240-1 by int1 270-1, may detect that the BFD session on control channel 340-1 (VLAN ID "1234") is down, as indicated by the large "X" on int1. 1234 shown in FIG. 4. Detecting the control session down, CE 230-1 may change the IGP values for all VLANs 310-1, 320-1, and 330-1 on physical interface int1 270-1. In an embodiment, CE 230-1 may iterate over every VLAN (except for VLAN 340-1, which corresponds to the control channel) and reassign IGP values so as to redirect traffic away from PE 240-1. All IGP values may be identically incremented to preserve the relative sense of distance and/or bandwidth for each VLAN.

For example, VLANs 310-1, 320-1, and 330-1, which connect with different remote client edge devices (not shown) and were previously assigned IGP values of 50, 60, and 110, respectively, may have their IGP values increased given control channel 340-1 signaled an maintenance event will occur as described above. In one scenario, the impending maintenance event on PE 240-1 may cause CE 230 to increment each IGP metric by the same value (e.g., by +1000 to 1050, 1060, and 1110, respectively), which would cause CEs 230 sharing pseudowires with CE 230-1 to preserve their relative distances. In such a scenario, if there is already an uncoordinated maintenance event occurring within the network, hub isolation may not occur and traffic may not shift or be sprayed from equal or non-distance sensitive metrics. The value to increase the IGP metrics may be arbitrary.

Once the IGP metrics are increased for VLANs on physical interface int1 270-1 (e.g., 310-1, 320-1, and 330-1), routing algorithms on CE 230-1 may route traffic over an alternate physical interface int2 270-2. For example, VLAN 330-2 (VLAN ID 300) may be used to route traffic with CE 230-2 over PW2 260-2 (shown in FIG. 3). Accordingly, the shift in IGP metrics over physical interface int1 may cause ingress traffic to move away from PE 240-1, provided there is still a redundant path that is available. In order to solve the egress traffic from PE 240-1, an adjustment may be performed on one or more remote CE device having pseudowire connections to CE 230-1, for example, CE 230-2, which will be described in more detail below with respect to FIG. 5.

In an embodiment, a script may run on a client edge device, such as, for example, CE 230-1, to monitor the state of the BFD session on the control channel (e.g., 340-1) for impending maintenance or other events, and subsequently adjust the IGP values for the VLANs associated with the physical interface (e.g. int1 270-1) when appropriate. Details of an exemplary client edge device are described below with respect to FIG. 6. In another embodiment, a separate device, e.g., a network monitoring system (NMS) 410 (indicated as being optional using dashed lines in FIG. 4), may monitor the state of the control channels for the CE within the network, and may further adjust IGP values accordingly based on the status of the monitored control channels. NMS 410 may reside within provider network 140, or alternatively may be an external device which interfaces to provider network 140 using a dedicated interface or through any provider edge device 240-x. NMS 410 may also be used for logging various error states which may occur within the network. For example, in the event that changes in the IGP metrics do not occur as described above in response to the appropriate control channel signal, error messages may be generated, for example, by CEs 230, and provided to NMS 410 for logging. Details of an exemplary network monitoring system are described below with respect to FIG. 7.

Figure 5:
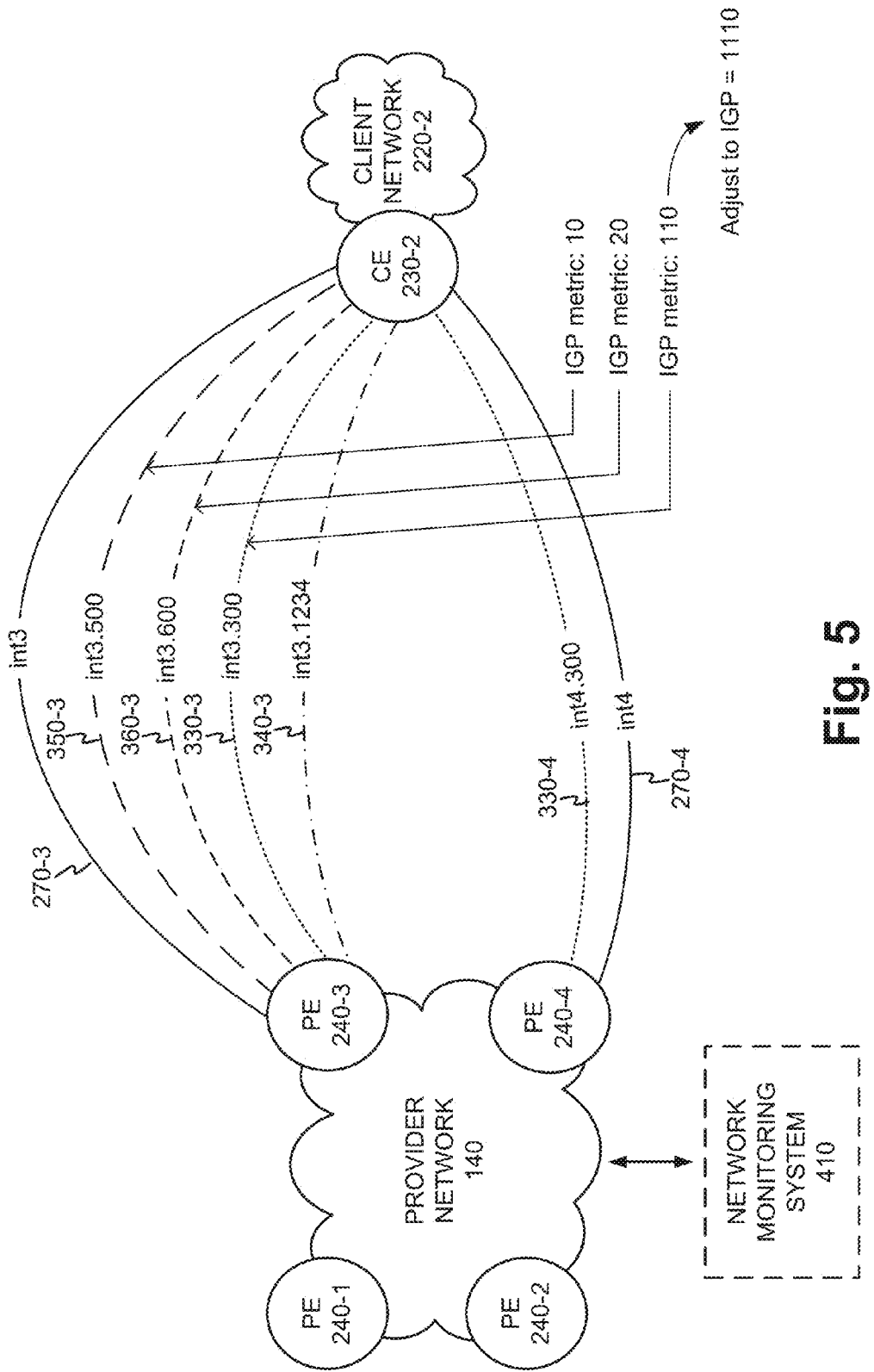
FIG. 5 is a diagram illustrating an embodiment where exemplary IGP adjustments may be performed by a remote CE device.

FIG. 5 is a diagram illustrating an embodiment where exemplary IGP adjustments which may be performed by a remote CE device (e.g., CE 230-2). For example, PE 240-3 may be directly connected to CE 230-2 over physical interface int3 270-3. Physical interface int3 270-3 may support VLANs 330-3, 350-3, and 360-3 for exchanging traffic with other CEs 230 over pseudowires, and may have steady state IGP values of 110, 10, 20, and, respectively. In this example, VLAN 330-3, having VLAN ID "300," is mapped to support PW1 260-1 as shown in FIG. 1.

In order to compensate for traffic being sent to local CE 230-1, which will be affected by impending maintenance of a PE 240-1, remote CE 230-2 may monitor inbound traffic for IGP changes at other client edge devices (e.g. CE 230-1), and compare such changes with IGP values being used by remote CE 230-2. Such monitoring may be performed based upon IGP advertisements sent by other CEs 230 over different physical interfaces. In an embodiment, remote CE 230-2 may monitor its IGP adjacencies over its PW interfaces for asymmetric metric advertisements. Determining interesting versus non-interesting adjacencies may be done by matching on interface descriptions (if a PW or some other identifier keyword for the overlay is used uniformly on the CEs). Accordingly, if remote CE 230-2 detects a change in IGP values from local CE 230-1 in corresponding VLAN 330-3 (which shares PW1 260-1 that is mapped from VLANs has a common VLAN ID "300"), remote CE 230-2 may alter its IGP values on the VLAN 330-3 to match the IGP values of local CE 230-1. For example, as shown in FIG. 5, CE 230-2 may adjust IGP metric of VLAN 330-3 (having VLAN ID "300") from 110 to 1110 in order to move traffic away from PE 240-1. That is, since the IGP metric is larger that an IGP metric on a VLAN associated with a redundant physical interface (e.g., 270-4), the traffic may be rerouted from CE 230-2 over PW2 240-2 (shown in FIG. 2) over VLAN 330-4 supported by physical interface int4 270-4.

All relevant CEs 230 route traffic away from PE 240-1 in a similar manner, and maintenance may commence on PE 240-1 without significant traffic impact. The interval to measure on PEs 240 may depend on the frequency of the polling cycle of CEs 230. Such measurement may be invoked by a script to gather all the PW interfaces, ingress and egress, per PE 240-x and determine if the interval has passed.

In an embodiment, upon detecting that the BFD session is down, local CE 230-1 may check to verify whether the detection actually indicates an impending maintenance event, or is the result of some other conditions, such as, for example, a failure on the physical interface itself. Accordingly, local CE 230-1 may first determine if all the sub-interfaces on physical interface int1 270-1 are also down (e.g., VLANs 310-1, 320-1, and 330-1 as shown in FIG. 3). If these sub-interfaces are not down, CE 230-1 may then assume that control channel 340-1 itself is not down, and thus may proceed with metric adjustments for rerouting traffic. In another embodiment, control channel 340-1 may be monitored in such a manner where any actions may wait for the down intervals plus one additional interval, to verify whether the entire physical link is down instead of just the BFD session on control channel 340-1.

In an embodiment, network monitoring system 410 may optionally check for the IGP changes at local client edge devices (e.g. CE 230-1), and compare such changes with IGP values being used at remote CE 230-2. Such monitoring may be performed based upon IGP advertisements sent by CEs 230 over different physical interfaces. Network monitoring system 410 is described in more detail in relation to FIG. 7.

It should be noted that by changing IGP values based on the advertisements of adjacent CEs 230 may create a "race condition" that could occur when a particular local client edge device (e.g., CE 230-1) reverts back to its original IGP metrics after maintenance at a provider edge device (e.g., PE 240-1) has been completed. For example, once local CE 230-1 detects that the BFD session is back up on control channel 340-1, it may decrease the IGP values of VLANs 310-1, 320-1, and 330-1 from their raised values of 1050, 1060, 1110, respectively, (as shown in FIG. 4) back to the original values of 50, 60, and 110, respectively, as shown in FIG. 3. It should be noted that the amounts used to adjust the IGP metrics may change among CEs 230, but should be consistent within a particular client CE 230-*x*. Once the IGP values associated with local CE 230-1 are changed, the remote CE 230-2, which is monitoring for IGP asymmetries, will lower the IGP values corresponding to VLANs having common VLAN IDs.

In order to avoid race conditions, an embodiment may maintain the context of which CEs 230 are local and which CEs 230 are remote with respect to each maintenance event so IGP values are not improperly being changed in response to other changing values (i.e., to avoid improperly "chasing" changing IGP values). The context of IGP changes may be preserved by monitoring local and remote changes for every maintenance event, so when IGP changes at a local CE 230-1 are restored to their original state on local CE 230-1, the IGP changes at the remote CE 230-2 follow suit, and not the other way around, where local CE 230-1 would raise its values to match the high IGP values of remote CE 230-2. Accordingly, the context of local versus remote, which is relative for each maintenance event, can be maintained to avoid improper IGP value changes.

Accordingly, when IGP changes are being made, the appropriate CE 230 may identify itself as a local or remote CE, depending upon its proximity to the PE 240 undergoing maintenance. IGP protocols such as Intermediate System to Intermediate System (ISIS) and Open Shortest Path First (OSPF) support route tagging which may be used as a way to differentiate advertisements. The differentiation may be accomplished by adding unique values to a preexisting tag associated with the IGP advertising message, where the unique values may be referred to as a "maintenance mode tag values." Accordingly, for example, when an adjustment is made by local CE 230-1 to increase the IGP value from 110 to 1110, the maintenance mode tag value (which may be an arbitrary integer, e.g., "101") may indicate the change was made by a local CE. The maintenance mode tag value may be appended to the advertising message and sent out to other CEs 230. When remote CE 230-2 increases its IGP value (e.g., from 110 to 1110 as shown in FIG. 5) in response to the advertisement that a local IGP was increased, a value (e.g., "102") may be provided as the maintenance mode tag value indicating the IGP change was initiated by a remote CE (e.g., CE 230-2). The maintenance mode tag values may be predefined and consistent within a client network 220-*x*. Accordingly, when a CE 230-*x* receives an advertisement having a maintenance mode tag value which indicates the IGP change was made by a local CE 230-*y*, the receiving CE 230-*x* would change its IGP values to follow suit. However, if CE 230-*x* receives an advertisement having a maintenance mode tag value which indicates the IGP change was made by a remote CE 230-*z*, the receiving CE 230-*x* would not change its IGP values to match the values in the received advertisement. In alternate embodiments, instead of using existing tag types, a new tag type (or flag) may be added to specifically identify the maintenance mode in an advertising message.

Figure 6:
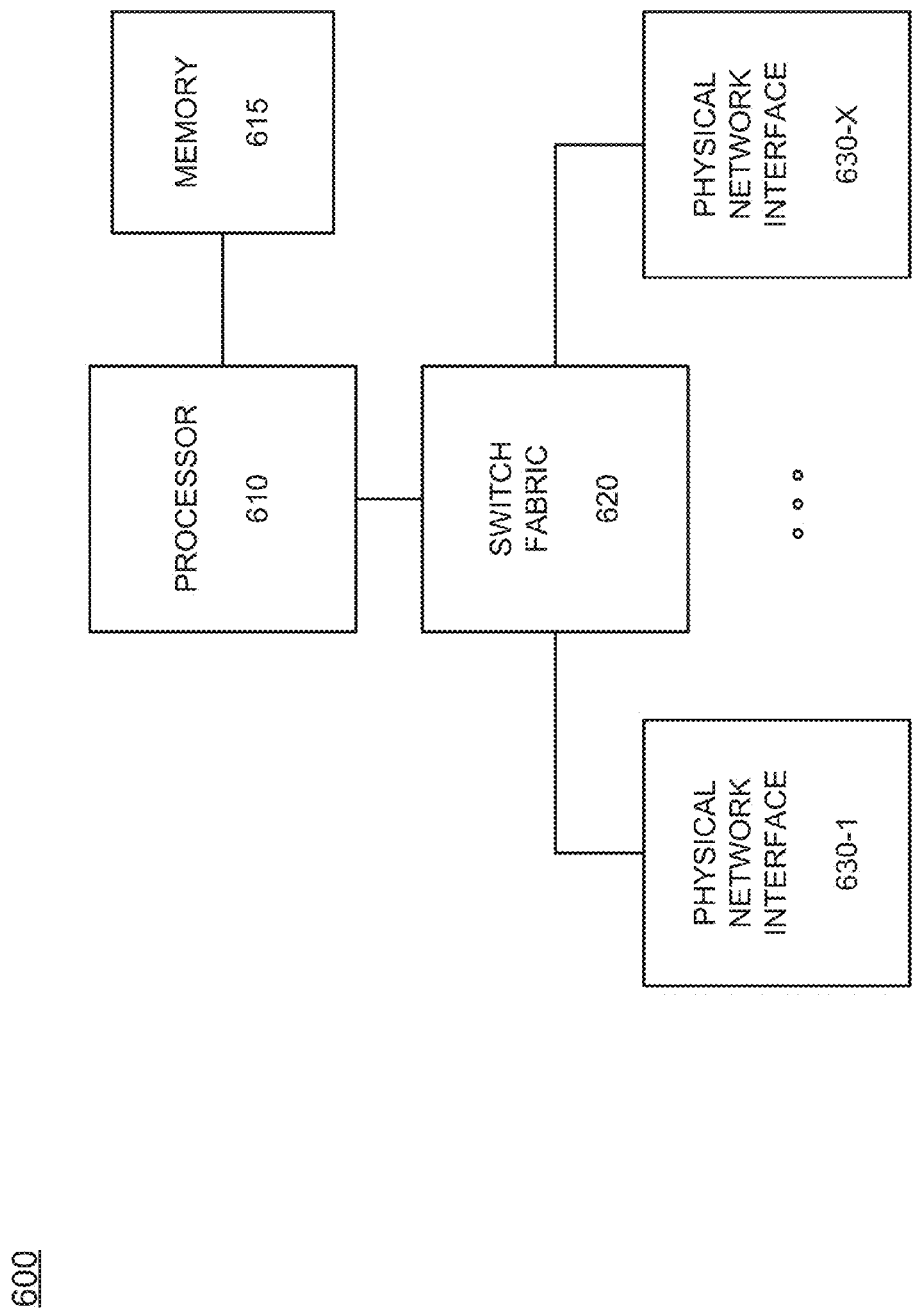
FIG. 6 is a block diagram of exemplary components of a network device.

FIG. 6 is a block diagram illustrating exemplary components of a network device 600 that may correspond to one or more of the devices in the previous figures. For example, CEs 230 and/or PEs 240 may be implemented according to the components illustrated Network device 600 may include a processor 610, a switch fabric 620, and physical network interfaces 630-1 through 630-X, in which X>1 (also referred to collectively as physical network interfaces 630 or individually as physical network interface 630-X). According to other embodiments, network device 600 may include fewer components, additional components, different components, and/or a different arrangement of components than those illustrated in FIG. 6 and described herein.

Processor 610 may include one or more processors, microprocessors, application specific integrated circuits (ASICs), field programming gate arrays (FPGAs), and/or processing logic that may be optimized for networking and communications. Processor 610 may also include one or multiple static memories 615 (e.g. read only memory (ROM)), one or multiple dynamic memories (e.g. random access memory (RAM)), one or multiple onboard caches and/or flash memories for storing data and/or machine-readable instructions.

Processor 610 may perform high level management functions for network device 600. For example, processor 610 may communicate with other networks, devices, and/or systems connected to network device 600 to exchange information regarding network topology, IGP values, etc. Processor 610 may also include a engine for determining appropriate routes and/or paths transferring packets throughout the network.

Switch fabric 620 include one or multiple switching planes to facilitate communication among physical network interfaces 630 and/or processor 610. According to an exemplary implementation, a switching plane includes a single-stage switch or a multi-stage switch of crossbar elements. Switch fabric 620 may also, or alternatively, include one or more processors, one or more memories, and/or one or more paths that permit communication among processor 610 and physical network interfaces 630.

Physical network interfaces 630 include devices or components, such as, for example, line cards, for receiving incoming packets from network links (or from other physical network interfaces 630) and for transmitting packets to network links (or to other physical network interfaces 630). Physical network interfaces 630 manage a set of input ports via which packets may be received and a set of output ports via which packets may be transmitted. Physical network interfaces 630 may include one or more processors, one or more memories, and/or other forms of logic and/or hardware.

According to an exemplary embodiment, network device 600 may perform IP routing and/or label switched path mapping to route and/or switch traffic flows. According to an exemplary implementation, network device 600 performs one or more operations of a process, for example, as described below in relation to FIG. 8, in response to processor 610 and/or physical network interfaces 630 executing logic which may be supplied by instructions and/or be hardware based.

Figure 7:
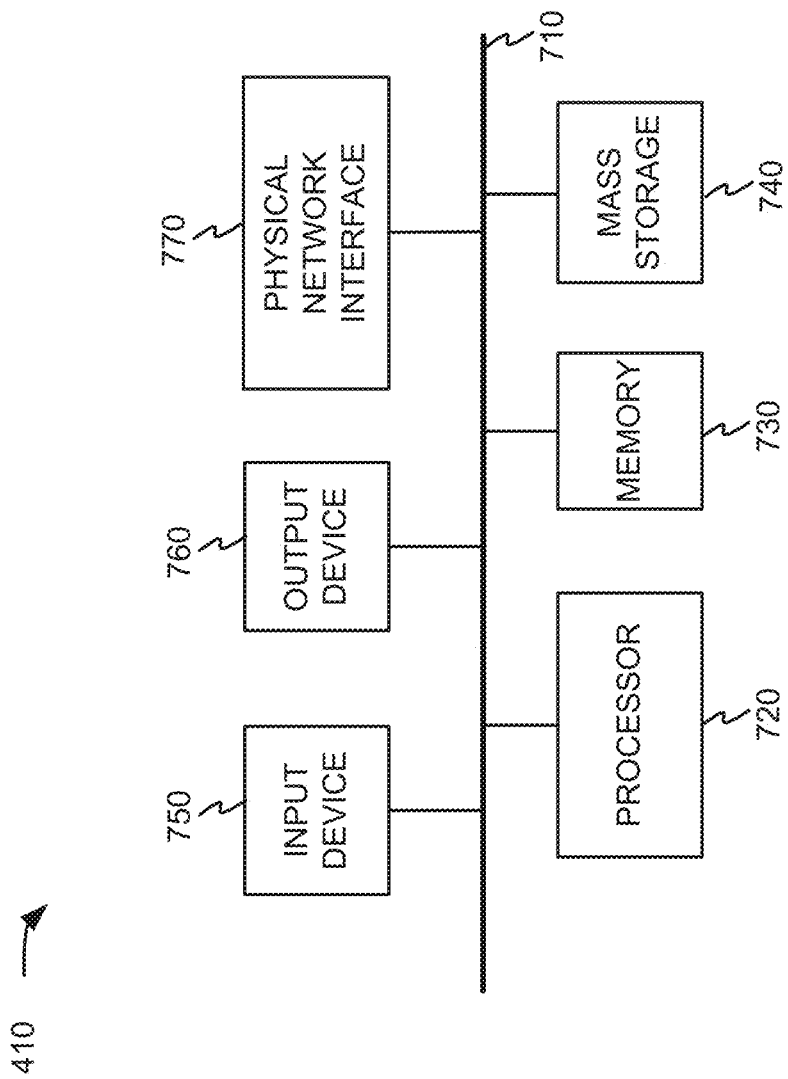
FIG. 7 is block diagram of an exemplary network monitoring system.

FIG. 7 is block diagram of an exemplary network monitoring system (NMS) 410.

NMS 410 may be included in provider network 140, or may be a third party system residing outside of provider network 140 which interfaces through a PE 240-*x* or an alternative interface. NMS 410 may observe each control channel designated to monitor maintenance events for all CEs 230, and push the appropriate commands (e.g., altering appropriate IGP values) to reroute traffic to compensate for maintenance events within provider network 140. In an embodiment, the NMS may be used to automatically initiate a notification of impending maintenance over a control channel by interacting with system which is used to schedule and/or announce maintenance events in provider network 140. The PEs 240 may be "logged in" to the NMS, and the control channel notification may be sanctioned by an operator, or may be automatically executed by NMS 410 itself. NMS 410 may subsequently monitor the network for error messages.

NMS 410 may include a bus 710, a processor 720, a memory 730, mass storage 740, an input device 750, an output device 760, and a physical network interface 770. Bus 710 includes a path that permits communication among the components of NMS 410. Processor 720 may include any type of single-core processor, multi-core processor, microprocessor, latch-based processor, and/or processing logic (or families of processors, microprocessors, and/or processing logics) that interprets and executes instructions. In other embodiments, processor 720 may include an application-specific integrated circuit (ASIC), a field-programmable gate array (FPGA), and/or another type of integrated circuit or processing logic. For example, the processor 720 may be an x86 based CPU, and may use any operating system, which may include varieties of the Windows, UNIX, and/or Linux. The processor 720 may also use high-level analysis software packages and/or custom software written in any programming and/or scripting languages for interacting with other network entities.

Memory 730 may include any type of dynamic storage device that may store information and/or instructions, for execution by processor 720, and/or any type of non-volatile storage device that may store information for use by processor 720. For example, memory 730 may include a RAM or another type of dynamic storage device, a ROM device or another type of static storage device, and/or a removable form of memory, such as a flash memory. Mass storage device 740 may include any type of on-board device suitable for storing large amounts of data, and may include one or more hard drives, solid state drives, and/or various types of Redundant Array of Independent Disk (RAID) arrays. Both memory 730 and/or mass storage device 740 would be suitable, for example, for storing instructions for monitoring control channels for impending maintenance in provider network 140, and for storing files/tables with IGP values and the appropriate IGP adjustment values for VLANs associated with CEs 230.

Input device 750, which may be optional, can allow an operator to perform maintenance on the network device. Input device 750 may include, for example, a keyboard, a mouse, a pen, a microphone, a remote control, an audio capture device, an image and/or video capture device, a touch-screen display, and/or another type of input device. In some embodiments, NMS 410 may be managed remotely and may not include input device 750. Output device 760 may output maintenance information to an operator, and may include a display (such as an Liquid Crystal Display (LCD)), a printer, a speaker, and/or another type of output device. In some embodiments, NMS 410 may be managed remotely and may not include output device 760.

Physical network interface 770 may include one or more transceivers that enable NMS 410 to communicate over provider network 140 through other provider side devices (e.g., PEs 240) to communicate with CEs 230 and/or systems. The physical network interface 770 may be a wireless communications (e.g., radio frequency (RF), infrared, and/or visual optics, etc.), wired communications (e.g., conductive wire, twisted pair cable, coaxial cable, transmission line, fiber optic cable, and/or waveguide, etc.), or a combination of wireless and wired communications. Physical network interface 770 may be coupled to one or more antennas for transmitting and receiving RF signals. Communication interface 770 may include a logical component that includes input and/or output ports, input and/or output systems, and/or other input and output components that facilitate the transmission/reception of data to/from other devices. For example, physical network interface 770 may include a network interface hardware (e.g., Ethernet card, multi-protocol label switching (MPLS) hardware, optical interfaces, etc.) for wired communications and/or a wireless network interface (e.g., a WiFi) card for wireless communications.

As described below, NMS 410 may perform certain operations relating to communications with CEs 230 and PEs 240. NMS 410 may perform these operations in response to processor 720 executing software instructions contained in a non-transitory computer-readable medium, such as memory 730 and/or mass storage 740. The software instructions may be read into memory 730 from another computer-readable medium or from another device. The software instructions contained in memory 730 may cause processor 520 to perform processes for monitoring control channels for impending maintenance and/or adjusting network metrics for rerouting traffic to compensate for maintenance on provider network 140. An exemplary process is described below in relation to FIG. 8. Alternatively, hard-wired circuitry may be used in place of, or in combination with, software instructions to implement processes described herein. Thus, implementations described herein are not limited to any specific combination of hardware circuitry and software.

Although FIG. 7 shows exemplary components of NMS 410, other implementations may include fewer components, different components, additional components, or differently arranged components than depicted in FIG. 7.

Figure 8:
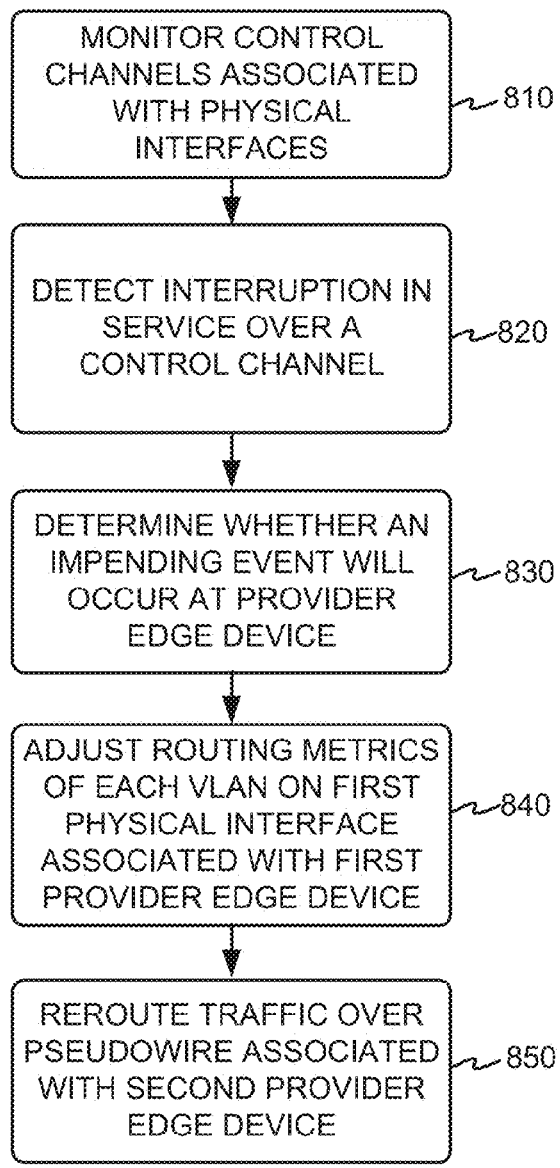
FIG. 8 is flow chart of an exemplary process for monitoring and adjusting network metrics to compensate for impending maintenance events.

FIG. 8 is flow chart of an exemplary process 800 for monitoring and adjusting network metrics to compensate for impending maintenance events. Process 800 may be performed by processor 610 within network device 600 (e.g., CEs 230), or by processor 720 within Network Monitoring System 410. Processor 610 and processor 720 may be hereinafter referred to in the alternative for the purposes of the following description as "processor 610/720."

Processor 610/720 may initially monitor control channels 340 associated with physical interfaces 270 between CE (e.g., 230-1) and a plurality of PEs (e.g., 240-1 and 240-2) (Block 810). Each physical interface (e.g. 270) may be associated with a separate control channel (e.g., 340) and at least one pseudowire (e.g., 260) which may be associated with VLANs (e.g., 310, 320, and 330). In an embodiment, processor 610/720 may establish a common VLAN identifier for control channels (e.g., 340) which is consistent for all of the physical interfaces (e.g., 270). The VLANs which support the pseudowire(s) may be established at a network layer (Layer 3). In an embodiment, processor 610/720 may monitor an impending maintenance status for each of the plurality of PEs (e.g. 240) through a link management protocol provided over each control channel (e.g., 340), where the link management protocol may include a separate Bidirectional Forwarding Detection (BFD) protocol on each control channel (e.g., 340).

Processor 610/720 may detect an interruption in service over a first control channel (e.g., 340-1) associated with a first physical interface (e.g., 270-1) (Block 820).

Processor 610/720 may determine, based upon the detected interruption, whether an impending maintenance or other event will occur at a first provider edge device (e.g., 240-1) associated with the first physical interface (e.g., 270-1) (Block 830). In an embodiment, determining whether an impending maintenance event will occur may further include having processor 610/720 detect an interruption in service over all pseudowire connections associated with the first physical interface (e.g., 270-1), determine a failure occurred in the first physical interface (e.g., 270-1) instead of the impending maintenance event, and routing traffic away from the first physical interface (e.g., 270-1) to the other physical interface(s) (e.g., 270-2) to avoid the failure and prevent unnecessary metric adjustments.

Processor 610/720 may adjust, in response to determining the impending maintenance event will occur, routing metrics of each VLAN (e.g., 310-1, 320-1, and 330-1) associated with the first physical interface (e.g., 270-1) (Block 840). Adjusting the routing metrics may cause ingress traffic to the first PE (e.g., 240-1) to be routed to a second PE (e.g., 240-2) associated with a second physical interface (e.g., 270-2). Adjusting routing metrics may include altering IGP values associated with each VLAN (e.g., 310-1, 320-1, and 330-1) associated with the first physical interface (e.g., 270-1).

Processor 610/720 may further generate a first advertisement message indicating the adjustments made to the routing metrics of each VLAN (e.g., 310-1, 320-1, and 330-1), append a first maintenance tag to the first advertising message to indicate the routing metrics were altered to compensate for impending maintenance at the first PE (e.g., 240-1), and send the first advertisement message to other CEs (e.g., 230).

In response to receiving the advertisement message, remote CE (e.g., 230-2) may compare remote routing metrics currently used by remote CE (e.g., 230-2) with the routing metrics reported in the first advertising message, adjust the remote routing metrics, on at least one VLAN corresponding to at least one pseudowire (e.g., 260-1) associated with the first physical interface (e.g., 270-1) to correspond with the routing metrics reported in the first advertising message, and send a second advertisement message to the other CEs (e.g., 230) reporting the adjustments to the remote routing metrics, along with an appended second maintenance tag which indicates adjustments were made in response to the first advertising message.

Processor 610/720 may reroute traffic to at least one remote CE (e.g., 230-2) over pseudowire(s) associated with the second PE (e.g., 240-2) (Block 850). For example, CE 230-1 may forward data to CE 230-2 over PW2 260-2, as opposed to PW1 260-1

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code. It being understood that software and control hardware can be designed to implement these aspects based on the description herein.

Further, certain portions of the invention may be implemented as a "component" or "system" that performs one or more functions. These components/systems may include hardware, such as a processor, an ASIC, a FPGA, or other processing logic, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
    monitoring control channels associated with physical interfaces between a client edge device and a plurality of provider edge devices, wherein each physical interface is associated with a separate control channel and at least one pseudowire, wherein the at least one pseudowire is associated with virtual local area networks (VLANs);
    reserving a common VLAN identifier for the control channels for all of the physical interfaces;
    detecting an interruption in service over a first control channel having the common VLAN identifier and associated with a first physical interface;
    determining, based upon the detected interruption, whether an impending event will occur at a first provider edge device associated with the first physical interface;
    adjusting, in response to determining the impending event will occur, routing metrics of each VLAN associated with the first physical interface, wherein the adjusting causes ingress traffic to be routed to a second provider edge device associated with a second physical interface; and
    rerouting traffic prior to the occurrence of the impending event to at least one remote customer edge device over at least one pseudowire associated with the second physical interface, wherein the rerouting avoids lost packets over the first physical interface that would otherwise result from the occurrence of the impending event.

2. The method of claim 1, wherein determining whether the impending event will occur further comprises:
    discriminating between a failure of the first physical interface and the detected interruption in service; and
    determining that a failure occurred in the first physical interface by detecting an interruption in service over all pseudowire connections associated with the first physical interface.

3. The method of claim 1, wherein determining, based upon the detected interruption, whether an impending event will occur further comprises:
    determining whether an impending maintenance event will occur.

4. The method of claim 1, wherein the VLANs which support the pseudowires are established at a network layer (Layer 3).

5. The method of claim 1, wherein monitoring control channels associated with physical interfaces further comprises:
    monitoring an impending maintenance status for each of the plurality of provider edge devices through a link management protocol provided over each control channel.

6. The method of claim 5, wherein monitoring an impending maintenance status for each of the plurality of provider edge devices through a link management protocol further comprises:
analyzing a separate Bidirectional Forwarding Detection (BFD) protocol on each control channel.

7. The method of claim 1, wherein adjusting, in response to determining the impending event will occur, routing metrics of each VLAN, further comprises:
altering Interior Gateway Protocol (IGP) values associated with each VLAN associated with the first physical interface.

8. The method of claim 7, wherein the altering IGP values comprises:
increasing IGP values for each VLAN associated with the first physical interface to a value greater than an IGP value associated with a different VLAN associated with a second physical interface.

9. The method of claim 1, wherein adjusting, in response to determining the impending event will occur, routing metrics of each VLAN, further comprises:
generating a first advertisement message indicating the adjustments made to the routing metrics of each VLAN;
appending a first maintenance tag to the first advertisement message to indicate the routing metrics were altered to compensate for impending maintenance at the first provider edge device; and
sending the first advertisement message to other client edge devices.

10. A network device, comprising:
a plurality of physical interfaces;
a memory storing path routing information for a network; and
a processor, coupled to the plurality of physical interfaces and the memory, configured to:
monitor control channels associated with the plurality of physical interfaces between the network device and a plurality of provider edge devices, wherein each physical interface is associated with a separate control channel and at least one pseudowire, wherein the at least one pseudowire is associated with virtual local area networks (VLANs),
reserve a common VLAN identifier for the control channels for all of the physical interfaces,
detect an interruption in service over a first control channel having the common VLAN identifier and associated with a first physical interface,
determine, based upon the detected interruption, whether an impending event will occur at a first provider edge device associated with the first physical interface,
adjust, in response to determining the impending event will occur, routing metrics of each VLAN associated with the first physical interface, wherein the adjusting causes ingress traffic to be routed a second provider edge device associated with a second physical interface, and
reroute traffic prior to the occurrence of the impending event to at least one remote customer edge device over at least one pseudowire associated with the second physical interface, wherein the rerouting avoids lost packets over the first physical interface that would otherwise result from the occurrence of the impending event.

11. The network device of claim 10, wherein when determining whether the impending event will occur, the processor is further configured to:
discriminate between a failure of the first physical interface and the detected interruption in service, and
determine that a failure occurred in the first physical interface by detecting an interruption in service over all pseudowire connections associated with the first physical interface.

12. The network device of claim 10, wherein when determining, based upon the detected interruption, whether an impending event will occur, the processor is further configured to:
determine whether an impending maintenance event will occur.

13. The network device of claim 10, wherein the VLANs which support the pseudowires are established at a network layer (Layer 3).

14. The network device of claim 10, wherein when monitoring control channels associated with physical interfaces, the processor is further configured to:
monitor an impending maintenance status for each of the plurality of provider edge devices through a link management protocol provided over each control channel.

15. The network device of claim 14, wherein when monitoring the impending maintenance status for each of the plurality of provider edge devices through a link management protocol, the processor is further configured to:
analyze a separate Bidirectional Forwarding Detection (BFD) protocol on each control channel.

16. The network device of claim 10, wherein when adjusting, in response to determining the impending event will occur, routing metrics of each VLAN, the processor is further configured to:
alter Interior Gateway Protocol (IGP) values associated with each VLAN associated with the first physical interface.

17. The network device of claim 16, wherein when altering IGP values, the processor is configured to:
increase IGP values for each VLAN associated with the first physical interface to a value greater than an IGP value associated with a different VLAN associated with a second physical interface.

18. The network device of claim 10, wherein when adjusting, in response to determining the impending event will occur, routing metrics of each VLAN, the processor is further configured to:
generate a first advertisement message indicating the adjustments made to the routing metrics of each VLAN,
append a first maintenance tag to the first advertisement message to indicate the routing metrics were altered to compensate for impending maintenance at the first provider edge device, and
send the first advertisement message to other client edge devices.

19. A non-transitory computer-readable medium comprising instructions, which, when executed by a processor, cause the processor to:
monitor control channels associated with physical interfaces between a client edge device and a plurality of provider edge devices, wherein each physical interface is associated with a separate control channel and at least one pseudowire is associated with virtual local area networks (VLANs);
reserve a common VLAN identifier for the control channels for all of the physical interfaces;

detect an interruption in service over a first control channel having the common VLAN identifier and associated with a first physical interface;

determine, based upon the detected interruption, whether an impending event will occur at a first provider edge device associated with the first physical interface;

adjust, in response to determining the impending event will occur, routing metrics of each VLAN associated with the first physical interface, wherein the adjusting causes ingress traffic to the first provider edge device to be routed to a second provider edge device associated with a second physical interface; and reroute traffic prior to the occurrence of the impending event to at least one remote customer edge device over at least one pseudowire associated with the second physical interface, wherein the rerouting avoids lost packets over the first physical interface that would otherwise result from the occurrence of the impending event.

20. The computer-readable medium of claim 19, wherein when determining whether the impending event will occur, comprises instructions which further cause the processor to:

discriminate between a failure of the first physical interface and the detected interruption in service; and determine that a failure occurred in the first physical interface by detecting an interruption in service over all pseudowire connections associated with the first physical interface.

* * * * *